Oct. 6, 1942.    E. V. BRISCOE    2,297,938
LISTER MOUNTING FOR DITCH CLEANERS
Filed June 16, 1941    3 Sheets-Sheet 1

INVENTOR.
E. V. Briscoe

ATTORNEYS

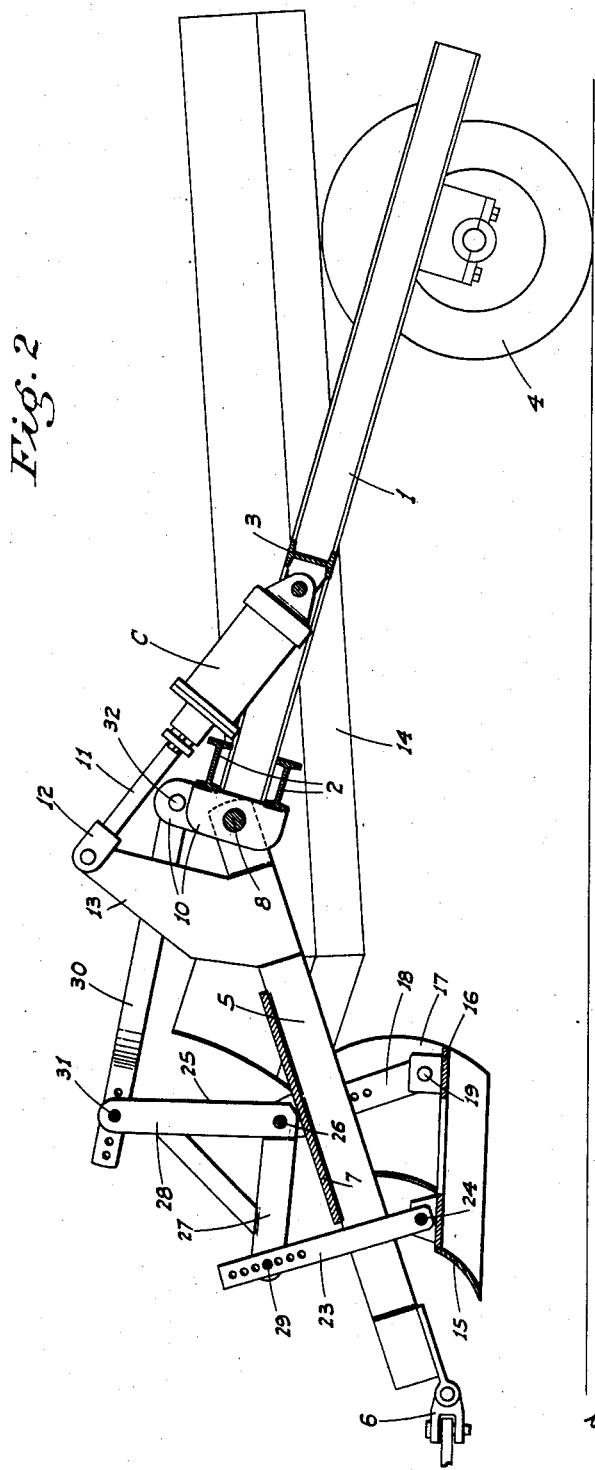

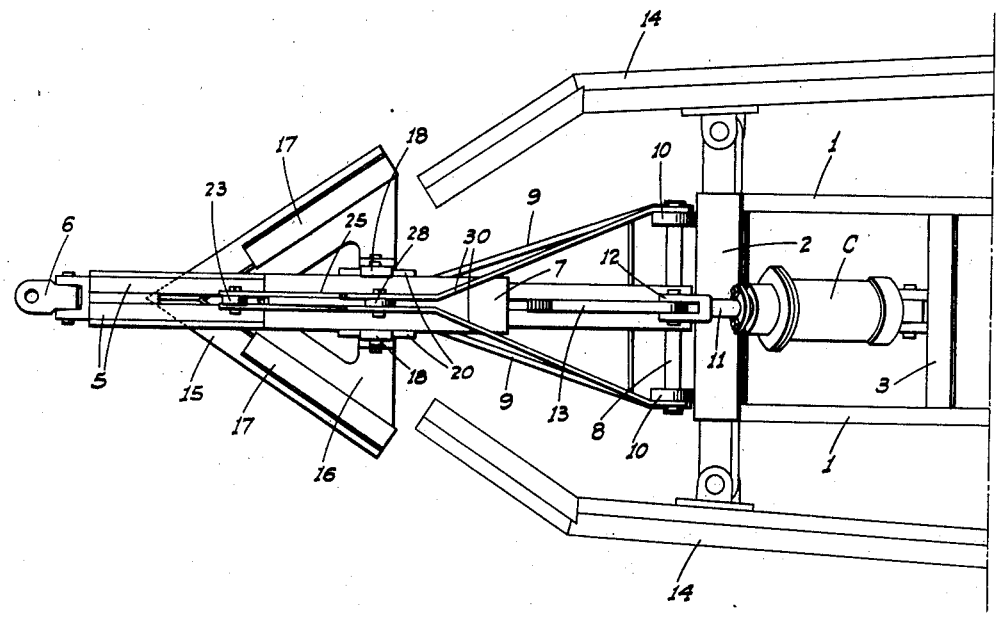
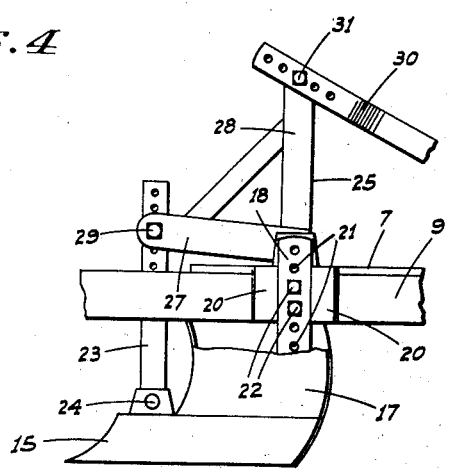

Patented Oct. 6, 1942

2,297,938

UNITED STATES PATENT OFFICE 2,297,938

LISTER MOUNTING FOR DITCH CLEANERS

Ernest V. Briscoe, Kerman, Calif.

Application June 16, 1941, Serial No. 398,284

10 Claims. (Cl. 37—98)

This invention relates in general to an improvement in ditch diggers and cleaners, and in particular the invention is directed to a unique mounting for a lister plow used in connection with such an implement, the present invention comprising an improvement over the lister mounting shown in my United States Letters Patent, No. 2,136,911, dated November 15, 1938.

In the above identified patent the lister was mounted in such manner that when the articulated implement frame was folded or buckled upward to a non-working position and for transport, the forwardly pointing lister assumed a forward and downward slope, causing it to frequently dig into the ground when the implement encountered and passed over relatively abruptly elevated ground, such as the ditch bank when the implement was being removed from the ditch.

It is therefore the principal object of this invention to provide a mounting for the lister which will prevent such digging in of the lister when the implement is in transport position; such mounting being arranged so that when the articulated frame folds upward, the lister is automatically swung about a pivotal connection and maintained in substantially a horizontal position or, in other words, substantially parallel to but some distance above its normal working position.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a similar view but with the implement and lister in transport position.

Figure 3 is a fragmentary plan view of the implement and lister mount.

Figure 4 is a fragmentary side elevation of the lister and mount therefor.

Figure 1:
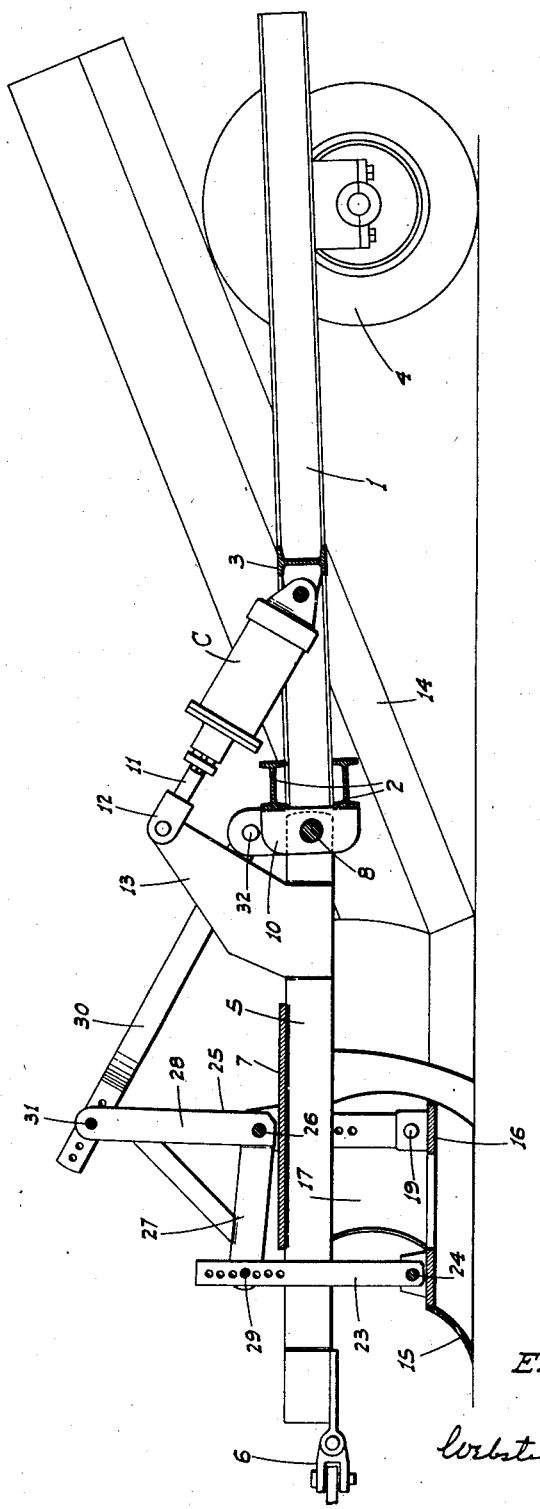
Figure 1 is a somewhat diagrammatic longitudinal section of a ditch cleaning implement in working position and embodying the improved lister mounting.

Referring now more particularly to the characters of reference on the drawings, the implement is of the same general assembly as shown in the above identified patent and includes the following:

The frame of the implement comprises an elongated substantially rectangular rear section which includes side members 1 connected together at the forward end by transverse I beams 2 secured on opposite edges of said members 1, and a transverse beam 3 some distance rearwardly of beams 2. Wheels 4 support the rear frame section adjacent the rear end thereof; these wheels being mounted in connection with the frame in any suitable manner.

A forward frame section extends longitudinally from the rear frame section and comprises parallel, closely spaced channel beams 5 which face inwardly; these beams being connected at their forward end by a universal draft coupling 6, intermediate their ends and on top by a flat plate 7, and at their rear end by a cross shaft 8 of substantial length. Side plates 9 diverge rearwardly from beams 5 intermediate their ends and connect with cross shaft 8 at its outer ends. The shaft 8 is carried in vertical, transversely spaced attachment ears 10 which are secured on and project edgewise in a forward direction from cross beams 2 of the rear frame section. It will thus be seen that the forward and rear frame sections are pivoted at adjacent ends for vertical folding or articulating action.

This folding action of the frame sections is effected by means of a double acting hydraulic cylinder C pivoted at its closed end on cross beam 3 centrally between side members 1. The piston is disposed at an upward and forward angle and the piston rod 11 is connected by clevis 12 with the upper end of a plate-like arm 13 which extends upward in rigid relation from between beams 5 of the forward frame section and at its upper end is in substantially overhanging relation to shaft 8. When the implement is in working position, as in Fig. 1, the rod 11 is retracted; and when the rod advances, the frame folds upward as in Fig. 2. Fluid pressure is supplied to cylinder C by any suitable means (not shown).

The earth working portions of the implement comprise elongated scraping blades 14 adjustably mounted on the rear frame section, and these blades extend from points alongside the forward frame section at an upward slope and in rearwardly diverging relation to a termination laterally of and above the rear end of said rear frame section; such blades being adapted to scrape and clean the sides of the banks of a ditch, and to discharge the refuse over the top thereof.

The bottom of the ditch is scraped by a plow known as a lister 15 which is mounted beneath the forward frame section in leading relation to the forward and lower ends of blades 14. The lister 15 is triangular and has a similarly shaped base 16 on opposite sides of which, and some distance rearwardly of the plow point, there are outcurved moldboards 17.

The lister is mounted by means of the following arrangement:

A pair of vertical supporting arms 18 are disposed in transversely spaced relation and pivoted, as at 19, on base 16 adjacent its rear edge; such vertical arms extending upward and engaging the outside of beams 5 in intersecting relation and between guide or locating blocks 20 on said beams. Each arm is formed with a longitudinal row of holes 21, through certain ones of which securing bolts 22 pass for connection with the beams 5. The depth of cut of lister 15 is regulated by the position of vertical adjustment of arms 18.

Another arm 23 upstands from the leading point of lister base 16, and is pivoted at its lower end on said base as at 24; such arm 23 extending between beams 5 in movable relation and terminating at its upper end some distance thereabove.

A vertical bell crank 25 is pivoted intermediate its ends on plate 7, as at 26, for longitudinal swinging movement; one leg 27 projecting forwardly and the other leg 28 upwardly. The outer end of leg 27 is pivoted at 29 to the portion of vertical arm 23 above beams 5, and such portion of said arm has a vertical row of holes to permit of vertical adjustment of the point of pivotal connection of leg 27 to vertical arm 23.

The upper end of leg 28 of the bell crank is connected by rearwardly diverging, parallel, and downwardly sloping links 30 to the upper end portions of attachment ears 10 which extend above the plane of the uppermost cross beam 2; such links being pivotally connected to both the leg 28 and ears 10, as at 31 and 32 respectively. The connection 31 is adjustable lengthwise of the links by providing a series of holes therein.

When the forward and rear frame sections are substantially alined, which is the normal working position, the lister 15 is in a substantially horizontal earth working position. Upon actuation of cylinder C and advancement of piston rod 11, the frame sections fold in an upward direction with shaft 8 as the point of articulation, and to transport position with blades 14 clear of the ground. As this articulation takes place, the links 30 effect a rearward swinging action of the bell crank relative to the forward frame section, which in turn pulls upward on vertical arm 23. This causes the lister 15 to swing upward at the point relative to the forward frame section and about pivots 19 as an axis. The extent of swinging movement of the lister is such as to maintain the same substantially horizontal and thus prevent the likelihood of the same digging in when relatively abrupt ground areas are encountered by the implement. As will be obvious, the lister returns to normal working position when the frame sections lower.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an implement which includes a longitudinally sectional frame supported for movement above and along the ground, said frame being arranged for power actuated upward articulation from a normal position; a lister disposed beneath one section and normally in a predetermined working position, a pair of longitudinally spaced arms depending from said one section, means pivoting said arms at the lower end on the lister, and means functioning with upward articulation of the frame to move one of said arms vertically relative to the other whereby to raise the point of the lister relative to said one section.

2. In an implement which includes a longitudinally sectional frame supported for movement above and along the ground, said frame being arranged for power actuated upward articulation from a normal position; a lister disposed beneath one section and normally in a predetermined working position, a pair of longitudinally spaced arms depending from said one section, means pivoting said arms at the lower end on the lister, and means functioning with upward articulation of the frame to raise the arm nearest the point of the lister relative to the other arm so as to raise the point of the lister relative to said one section.

3. In an implement which includes a longitudinally sectional frame supported for movement above and along the ground, said frame being arranged for power actuated upward articulation from a normal position; a lister disposed beneath one section and normally in a predetermined working position, a pair of longitudinally spaced arms depending from said one section, means pivoting said arms at the lower end on the lister, that one of the arms nearest the point of the lister being arranged in vertically movable, guided relation to said one section and the other arm being secured to said section, and upstanding bell crank mounted on said one section, one leg of said crank being pivotally connected with said one arm, and means connected between the other leg of the bell crank and the other frame section, functioning with upward articulation of the frame, to swing the bell crank relative to said one section in a direction to raise said one arm and the point of the lister relative to the same section.

4. In an implement which includes a longitudinally sectional frame supported for movement above and along the ground, said frame being arranged for power actuated upward articulation from a normal position; a forwardly pointing lister disposed beneath the forward section of the frame, upstanding longitudinally spaced arms pivoted on the lister, means securing the rear arm adjacent its upper end on the forward section, the forward arm being guided on said section against lateral deflection and extending thereabove, an upstanding bell crank pivoted on said forward section on a transverse axis and rearwardly of said forward arm, one leg of the bell crank extending forwardly and pivoted in connection with the forward arm above said forward section, the other leg of the bell crank projecting upwardly, and a longitudinally extending link pivotally connected between said other leg and the rear section of the frame.

5. In an implement which includes a longitudinally sectional frame supported for movement above and along the ground, said frame being arranged for power actuated upward articulation from a normal position; a forwardly pointing lister disposed beneath the forward section of the frame, upstanding longitudinally spaced arms pivoted on the lister, means securing the rear arm adjacent its upper end on the forward section, said forward section including transversely spaced beams, the forward arm projecting therebetween with an easy fit and extending some distance thereabove, and means connected with the forward arm above said beams, and functioning with upward articulation of the frame to raise said forward arm relative to said forward section.

6. In an implement which includes a longitudinally sectional frame supported for movement above and along the ground, said frame being arranged for power actuated upward articulation from a normal position; a lister disposed beneath the forward section, means mounting said lister in connection with said forward section in longitudinal immovable relation and for relative vertical movement at the point, the lister normally being disposed in a predetermined working position, a link connected with the rear section and projecting forwardly in overhanging relation to the forward section, and means connected between said link and the lister mounting means functioning with upward articulation of the frame to raise the point of the lister relative to said forward section.

7. A device as in claim 6 in which said connecting means comprises an upstanding bell crank mounted on the forward section on a transverse axis.

8. In an implement which includes a longitudinally sectional frame supported for movement above and along the ground, said frame being arranged for power actuated upward articulation from a normal position; a lister disposed beneath one section of the frame and pointing in the direction of travel, said lister having a substantially triangular base, a pair of upstanding, transversely spaced arms pivoted on the base adjacent its rear edge, another upstanding arm pivoted on the base adjacent the point, means securing said pair of arms on said one section, and means connected with the other arm and functioning with upward articulation of the frame to raise said other arm relative to said one section.

9. In an implement which includes a longitudinally sectional frame supported for movement above and along the ground, said frame being arranged for power actuated upward articulation from a normal position; a lister disposed beneath one section of the frame and pointing in the direction of travel, said lister having a substantially triangular base, a pair of upstanding, transversely spaced arms pivoted on the base adjacent its rear edge, another upstanding arm pivoted on the base adjacent the point, said one section above the lister including transversely spaced beams, the pair of arms engaging said beams and being secured thereto, the forward arm slidably projecting between said beams, and means connected with the other arm and functioning with upward articulation of the frame to raise said other arm relative to said one section.

10. A device as in claim 9 in which the arms of said pair are secured on said one section for relative vertical adjustment; there being guide blocks fixed on said one section and engaging opposite surfaces of said arms.

ERNEST V. BRISCOE.